US009774269B2

(12) United States Patent
Matsubara et al.

(10) Patent No.: US 9,774,269 B2
(45) Date of Patent: Sep. 26, 2017

(54) BIDIRECTIONAL DC/DC CONVERTER

(71) Applicant: FUJI ELECTRIC CO., LTD., Kawasaki (JP)

(72) Inventors: Kunio Matsubara, Hino (JP); Yukihiro Nishikawa, Kodaira (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 14/844,839

(22) Filed: Sep. 3, 2015

(65) Prior Publication Data

US 2015/0381064 A1    Dec. 31, 2015

Related U.S. Application Data

(63) Continuation of application No. PCT/JP2014/063013, filed on May 16, 2014.

(30) Foreign Application Priority Data

Jul. 11, 2013  (JP) .................................. 2013-145469

(51) Int. Cl.
*H02M 3/335* (2006.01)
*H02M 7/48* (2007.01)

(52) U.S. Cl.
CPC ... *H02M 3/33546* (2013.01); *H02M 3/33584* (2013.01); *H02M 2007/4815* (2013.01); *Y02B 70/1433* (2013.01); *Y02B 70/1441* (2013.01)

(58) Field of Classification Search
CPC ......... H02M 3/33569; H02M 3/33776; H02M 7/53871; Y02B 70/1433

(Continued)

(56) References Cited

U.S. PATENT DOCUMENTS 4,951,185 A    8/1990  Schutten et al.
7,848,118 B2  12/2010  Shimada et al.
(Continued)

FOREIGN PATENT DOCUMENTS

CN         101378232 A    3/2009
DE   10 2012 111 063 A1   5/2013
(Continued)

OTHER PUBLICATIONS

International Search Report dated Jul. 29, 2014 in corresponding international application PCT/JP2014/063013.
(Continued)

*Primary Examiner* — Nguyen Tran (57) ABSTRACT

A bidirectional DC/DC converter includes first and second control circuits, and first and second bridge circuits respectively connected to first and second direct current voltage supplies. In one embodiment variant, when power is supplied from the first direct current voltage supply to the second direct current voltage supply, the first control circuit carries out PFM control of the first bridge circuit at a frequency equal to or lower than the resonance frequency of an LC resonant circuit in accordance with a control amount based on the voltage and current of the second direct current voltage supply. When power is supplied in the other direction, the second control circuit carries out fixed frequency control of the second bridge circuit, using phase shift control or the like, in accordance with a control amount based on the voltage and current of the first direct current voltage supply.

5 Claims, 5 Drawing Sheets

1 1, 2 1 : DIRECT CURRENT VOLTAGE SUPPLY
1 2, 2 2 : SMOOTHING CAPACITOR
1 4 a : RESONANT REACTOR
1 4 b : RESONANT CAPACITOR
3 0 : ISOLATING TRANSFORMER
3 1 : PRIMARY COIL
3 2 : SECONDARY COIL
$Q_1$ to $Q_8$ : I G B T
$G_1$ to $G_8$ : GATE SIGNAL (58) Field of Classification Search
USPC .................. 363/16, 17, 21.02, 21.03, 98
See application file for complete search history.

(56) References Cited

U.S. PATENT DOCUMENTS

| | | | | |
|---|---|---|---|---|
| 8,243,473 | B2* | 8/2012 | Chen ................ | H02M 3/33592 363/127 |
| 2010/0328967 | A1 | 12/2010 | Cody et al. | |
| 2012/0014138 | A1 | 1/2012 | Ngo et al. | |
| 2013/0322128 | A1* | 12/2013 | Takegami ......... | H02M 3/33507 363/17 |
| 2014/0028092 | A1 | 1/2014 | Takeshima et al. | |
| 2015/0333634 | A1* | 11/2015 | Yoshida ............ | H02M 3/33576 363/21.03 |

FOREIGN PATENT DOCUMENTS

| | | |
|---|---|---|
| JP | 03-251079 | 11/1991 |
| JP | 06-141541 | 5/1994 |
| JP | 2002-262569 | 9/2002 |
| JP | 2010-206858 | 9/2010 |
| JP | 2011-120370 | 6/2011 |
| JP | 2011-526478 | 10/2011 |
| JP | 2012-070491 | 4/2012 |
| JP | 2013-027270 | 2/2013 |
| WO | WO 2012/144249 A1 | 10/2012 |

OTHER PUBLICATIONS

Satoru Inakagata et al., "Efficiency Improvement of AC/DC Power Station", Panasonic Technical Report, vol. 59, No. 3, pp. 4-11, Sep. 2011.

Extended European Search Report dated Apr. 7, 2017 in corresponding European Patent Application No. 14823256.4.

Chinese Office Action dated Mar. 20, 2017 in corresponding Chinese Patent Application No. 201480012249.2.

* cited by examiner

BIDIRECTIONAL DC/DC CONVERTER

CROSS-REFERENCE TO RELATED APPLICATIONS

This application is a continuation application, filed under 35 U.S.C. §111(a), of International Application PCT/JP2014/063013, filed on May 16, 2014, and claims benefit of foreign priority to Japanese Patent Application 2013-145469, filed Jul. 11, 2013, the disclosure of each of which is incorporated herein by reference.

BACKGROUND

1. Field

The present disclosure relates to a bidirectional DC/DC converter that carries out DC/DC conversion in two directions via an isolating transformer, and in particular, relates to a bidirectional DC/DC converter suited to an application wherein the input/output voltage range is wide, for example, as a battery charger.

2. Description of Related Art

A so-called resonant bidirectional DC/DC converter that utilizes the resonance phenomenon of an LC resonant circuit configured of a reactor and capacitor is disclosed in patent application publication JP-A-2012-70491 (e.g., paragraphs [0019] to [0029], FIG. 1, FIG. 7, FIG. 8) and in "Efficiency Improvement of AC/DC Power Station", Panasonic Technical Report, Vol. 59, No. 3, pp. 4-11. Also, it is described in these documents that, in order to reduce loss and noise in drive circuits (bridge circuits) connected to the primary side and secondary side of an isolating transformer, thereby optimizing resonance operation, resonance frequency is caused to coincide in bidirectional power flow via the isolating transformer by adding a regulator circuit, or the like, and regulating the constants of the LC resonant circuit.

Figure 5:
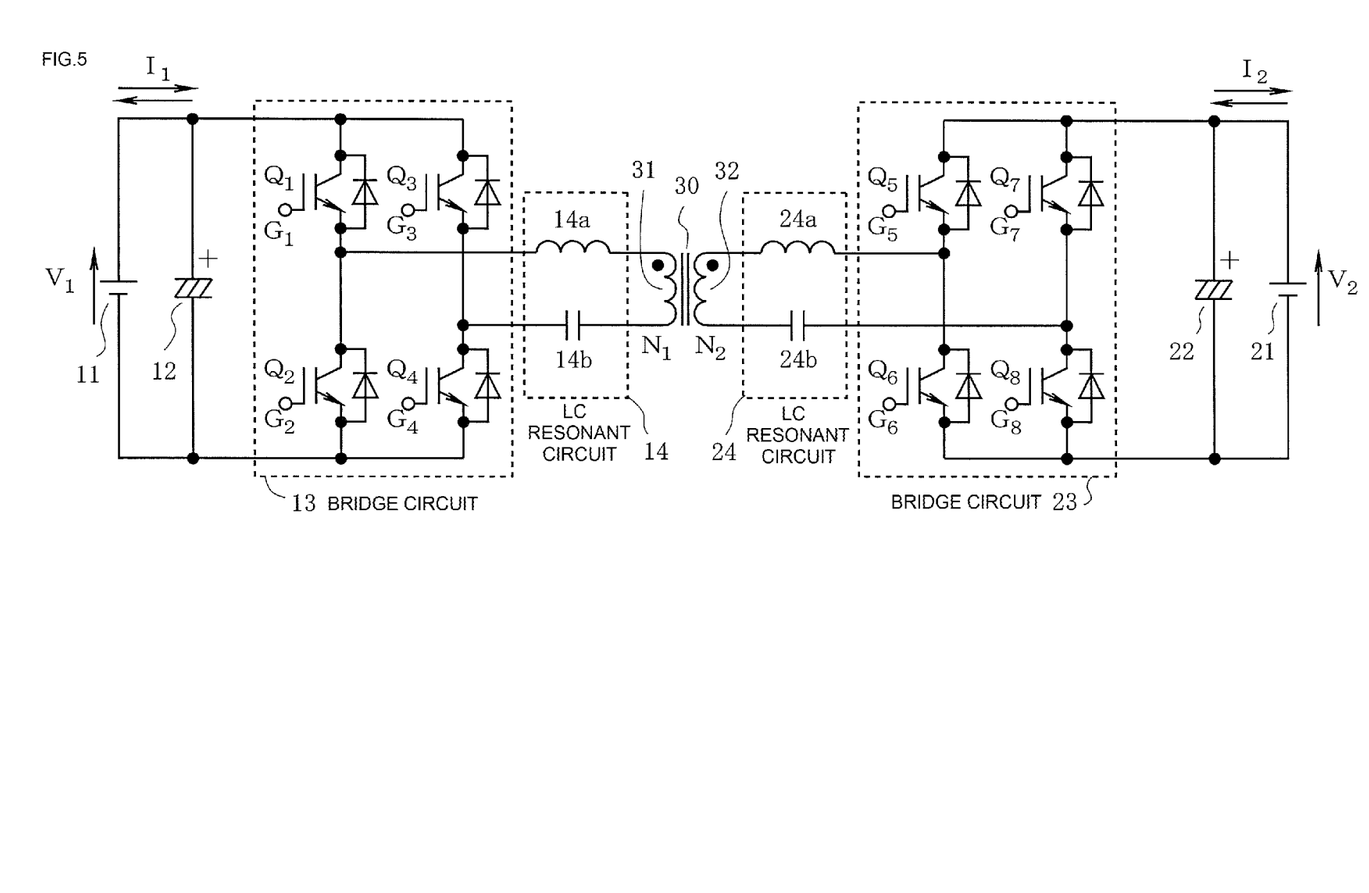
FIG. 5 is a circuit diagram showing existing technology of a resonant bidirectional DC/DC converter.

FIG. 5 is a circuit diagram showing an existing resonant bidirectional DC/DC converter. The circuit is an example wherein full bridge circuits are disposed with bilateral symmetry centered on an isolating transformer, and an LC resonant circuit is connected between the isolating transformer and each full bridge circuit as means of optimizing the bidirectional resonance operation, wherein insulated-gate bipolar transistors (IGBTs) to which free wheeling diodes are connected in anti-parallel are used as semiconductor switch elements configuring the full bridge circuits.

In FIG. 5, the circuit includes direct current voltage supplies 11 and 21 (the voltages thereof are taken to be V1 and V2 respectively), smoothing capacitors 12 and 22, bridge circuits 13 and 23 that operate as switching circuits or rectifier circuits, LC resonant circuits (series resonant circuits) 14 and 24, an isolating transformer 30, a primary coil 31 thereof, and a secondary coil 32. Also included are semiconductor switch elements $Q_1$ through $Q_4$ and $Q_5$ through $Q_8$ configuring the bridge circuits 13 and 23 respectively, resonant reactors 14a and 24a, and resonant capacitors 14b and 24b. When using this bidirectional converter as, for example, a battery charger, one of the direct current voltage supplies 11 and 21 forms the battery, while the other functions as a direct current power supply. G1 through G8 indicate gate signals (gate electrodes) of the semiconductor switch elements $Q_1$ through $Q_8$, and N1 and N2 indicate the numbers of turns of the coils 31 and 32, respectively.

In the heretofore described configuration, the bridge circuit 13 converts direct current power into alternating current power using switching operations of the semiconductor switch elements $Q_1$ through $Q_4$ when power flows from the direct current voltage supply 11 to the direct current voltage supply 21, and converts alternating current power into direct current power using rectifying operations of the free wheeling diodes when power flows from the direct current voltage supply 21 to the direct current voltage supply 11. In the same way, the bridge circuit 23 converts alternating current power into direct current power using rectifying operations of the free wheeling diodes when power flows from the direct current voltage supply 11 to the direct current voltage supply 21, and converts direct current power into alternating current power using operations of the semiconductor switch elements $Q_5$ through $Q_8$ when power flows from the direct current voltage supply 21 to the direct current voltage supply 11.

Herein, when power flows from the direct current voltage supply 11 to the direct current voltage supply 21, the voltage applied when there is reverse recovery of the free wheeling diodes of the semiconductor switch elements $Q_5$ through $Q_8$ is clamped to the voltage $V_2$ of the direct current voltage supply 21. Also, when power flows from the direct current voltage supply 21 to the direct current voltage supply 11, the voltage applied when there is reverse recovery of the free wheeling diodes of the semiconductor switch elements $Q_1$ through $Q_4$ is clamped to the voltage $V_1$ of the direct current voltage supply 11. According to this bidirectional DC/DC converter, low breakdown voltage elements that generally have low loss occurrence can be used as the semiconductor switch elements $Q_1$ through $Q_8$, and high conversion efficiency can thus be obtained.

It is known that, when arranging so that output voltage is variable in this kind of bidirectional DC/DC converter, the semiconductor switch elements $Q_1$ through $Q_8$ are driven using pulse frequency modulation (PFM) control, as disclosed in, for example, patent application publication JP-A-2011-120370 (e.g., paragraphs [0022] to [0044], FIG. 2). As is commonly known, PFM control is a control method whereby the duty ratios of the drive signals of the semiconductor switch elements $Q_1$ through $Q_8$ are changed by changing the switching frequency.

Figure 6A:
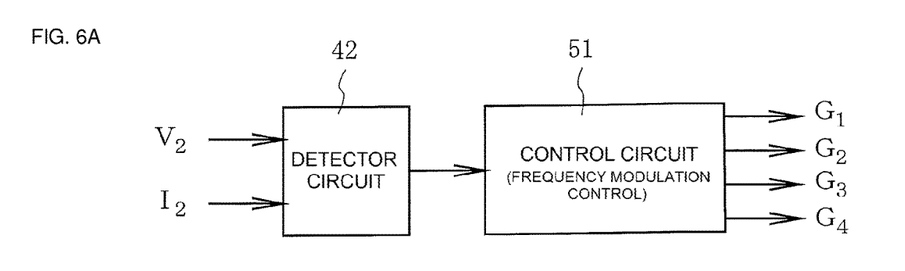
FIGS. 6A and 6B are configuration diagrams of control means in FIG. 5.
Figure 6B:
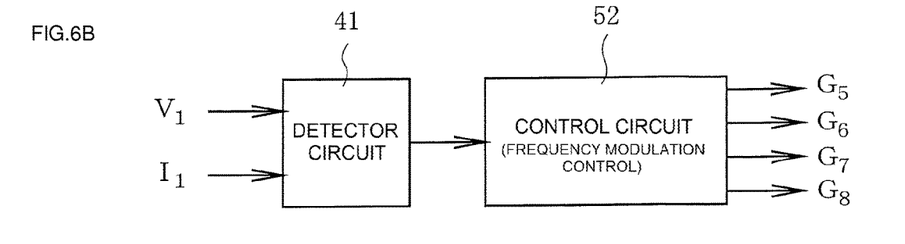

FIGS. 6A and 6B are configuration diagrams of control means for carrying out PFM control of the semiconductor switch elements $Q_1$ through $Q_8$. FIG. 6A is control means of the semiconductor switch elements $Q_1$ through $Q_4$ of the bridge circuit 13, and is configured of a detector circuit 42, which detects the voltage $V_2$ and a current $I_2$ of the direct current voltage supply 21, and a control circuit 51, which generates the gate signals $G_1$ through $G_4$ for carrying out PFM control of the semiconductor switch elements $Q_1$ through $Q_4$ based on values detected by the detector circuit 42. Also, FIG. 6B is control means of the semiconductor switch elements $Q_5$ through $Q_8$ of the bridge circuit 23, and is configured of a detector circuit 41, which detects the voltage $V_1$ and a current $I_1$ of the direct current voltage supply 11, and a control circuit 52, which generates the gate signals $G_5$ through $G_8$ for carrying out PFM control of the semiconductor switch elements $Q_5$ through $Q_8$ based on values detected by the detector circuit 41.

The semiconductor switch elements $Q_1$ through $Q_4$ are driven via a gate drive circuit (not shown) by the gate signals $G_1$ through $G_4$ output from the control circuit 51 when power flows from the direct current voltage supply 11 to the direct current voltage supply 21. Therefore, control whereby the voltage $V_2$ of the direct current voltage supply 21 coincides with a command value is carried out. Also, the semiconductor switch elements $Q_5$ through $Q_8$ are driven via a gate drive circuit by the gate signals $G_5$ through $G_8$ output from the control circuit 52 when power flows from the direct current voltage supply 21 to the direct current voltage supply 11. Therefore, control whereby the voltage $V_1$ of the direct current voltage supply 11 coincides with a command value is carried out. By carrying out PFM control of the semiconductor switch elements $Q_1$ through $Q_8$ using the control means shown in FIGS. 6A and 6B, output voltage can be variably controlled in bidirectional power flow.

Meanwhile, according to JP-A-2002-262569 (paragraphs [0002], [0003], and the like) (U.S. Pat. No. 4,951,185), the output voltage characteristics with respect to switching frequency change depending on the size of the load when PFM control is applied to a resonant DC/DC converter, and in particular, when there is a light load or no load, the output voltage cannot be controlled to or below a certain value even when the switching frequency is increased, and it is pointed out that application to an application wherein the input/output voltage range is wide, as with a battery charger, is difficult.

SUMMARY

As previously mentioned, the existing technology described in patent application publication JP-A-2012-70491 and Panasonic Technical Report, Vol. 59, No. 3, pp. 4-11 is such that it is necessary to have a circuit, or the like, that regulates the constants of a resonant circuit to optimize resonant operation. For example, in the circuit of FIG. 5, one of the LC resonant circuits fulfils the function of regulating the constants of the resonant circuit. Therefore, the existing bidirectional DC/DC converter is such that the circuit configuration is complex, and there is a problem in that the size increases.

Also, in FIG. 5, FIG. 6A, and FIG. 6B, the device specifications are such that, for example, the voltage $V_1$ of the direct current voltage supply 11 is constant, and the voltage (output voltage) $V_2$ of the direct current voltage supply 21 is controlled in a range from a minimum value $V_{2min}$ to a maximum value $V_{2max}$. In this configuration, when power flows from the direct current voltage supply 11 to the direct current voltage supply 21 as a reference, the output voltage cannot be controlled to or below a certain value when there is a light load or no load and when PFM control of a resonant inverter is carried out, as previously mentioned, because of which, when the output voltage is the minimum value $V_{2min}$, the switching frequency of the semiconductor switch elements $Q_1$ through $Q_4$ is set to a resonance frequency $f_r$ of the LC resonant circuit 14 and a turn ratio a of the isolating transformer 30 is set to $N_1/N_2=V_1/V_{2min}$. As a result of this, the switching frequency is controlled to or below the resonance frequency $f_r$, and the output voltage is controlled within a range wherein the minimum value is $V_{2min}=(1/a)\times V_1$ (the switching frequency=the resonance frequency $f_r$ of the LC resonant circuit 14) and the maximum value is $V_{2max}=(1/a)\times V_1\times\alpha$ ($\alpha$ is the voltage conversion gain when the switching frequency is $f_r$ or less).

However, when power flows from the direct current voltage supply 21 to the direct current voltage supply 11 and the voltage (input voltage) $V_2$ of the direct current voltage supply 21 is the minimum value $V_{2min}$, $V_1=a\times V_{2min}$, and the voltage $V_1$ can be output by the switching frequency of the semiconductor switch elements $Q_5$ through $Q_8$ being the resonance frequency $f_r$ of the LC resonant circuit 24. But when the input voltage is the maximum value $V_{2max}$, it is necessary to increase the switching frequency beyond $f_r$ because $V_1<a\times V_{2max}$. However, as previously mentioned, the output voltage cannot be controlled to or below a certain value when carrying out PFM control of a resonant inverter, even when the switching frequency is increased, because there is concern that the desired voltage $V_1$ cannot be output when there is a light load or no load. That is, it is understood that it is difficult to have an application with a wide input/output voltage range when carrying out PFM control of a resonant bidirectional DC/DC converter.

Therefore, in order to resolve this problem, an aspect of embodiments of the invention is to provide a resonant bidirectional DC/DC converter such that there is no need for a circuit, or the like, that regulates the constants of an LC resonant circuit, and that is also applicable to an application wherein the input/output voltage range is wide.

In order to resolve the heretofore described problem, a first aspect of the invention is a bidirectional DC/DC converter including a first bridge circuit connected to a first direct current voltage supply and formed of a multiple of semiconductor switch elements; a second bridge circuit connected to a second direct current voltage supply and formed of a multiple of semiconductor switch elements; an isolating transformer that isolates the first bridge circuit and second bridge circuit; and a series resonant circuit connected between the alternating current side of the first bridge circuit and the isolating transformer, wherein power can be reciprocally supplied between the first direct current voltage supply and second direct current voltage supply by causing the first bridge circuit or second bridge circuit to carry out a switching operation. The bidirectional DC/DC converter further includes a first detector circuit that detects at least a voltage value or a current value of the first direct current voltage supply; a second detector circuit that detects at least a voltage value or a current value of the second direct current voltage supply; a second control circuit that controls the second bridge circuit based on a value detected by the first detector circuit; and a first control circuit that controls the first bridge circuit based on a value detected by the second detector circuit. The first control circuit carries out pulse frequency modulation control of the first bridge circuit at a frequency equal to or lower than the resonance frequency of the series resonant circuit based on a control amount determined in accordance with a value detected by the second detector circuit when power is supplied from the first direct current voltage supply to the second direct current voltage supply. The second control circuit carries out fixed frequency control of the second bridge circuit based on a control amount determined in accordance with a value detected by the first detector circuit when power is supplied from the second direct current voltage supply to the first direct current voltage supply. As used in the specification and the claims, the term "or" in the phrase "a voltage value or a current value" has the meaning of an inclusive "or," rather than a mutually-exclusive "or."

A second aspect of the invention is a bidirectional DC/DC converter including a first bridge circuit, a second bridge circuit, an isolating transformer, and a series resonant circuit. The bidirectional DC/DC converter further includes a first detector circuit, a second detector circuit, a first control circuit, and a second control circuit, wherein the first control circuit includes control means that carries out fixed frequency control in the vicinity of the resonance frequency of the series resonant circuit, control means that carries out pulse frequency modulation control at a frequency equal to or lower than the resonance frequency, and switching means that switches between the fixed frequency control and the pulse frequency modulation control based on a control amount. The control amount is determined in accordance with a value detected by the second detector circuit when power is supplied from the first direct current voltage supply to the second direct current voltage supply. The second control circuit carries out fixed frequency control of the second bridge circuit based on a control amount determined in accordance with a value detected by the first detector circuit when power is supplied from the second direct current voltage supply to the first direct current voltage supply.

A third aspect of the invention is the bidirectional DC/DC converter according to the second aspect, wherein the switching means switches from fixed frequency control to pulse frequency modulation control when the control amount determined in accordance with a value detected by the second detector circuit is a control amount such that exceeds the maximum value that can be output by a fixed frequency control operation of the converter.

A fourth aspect of the invention is the bidirectional DC/DC converter according to the first, second, or third aspect, wherein the second control circuit has control means that causes the second bridge circuit to carry out a synchronous rectification operation when power is supplied from the first direct current voltage supply to the second direct current voltage supply. A fifth aspect of the invention is a bidirectional DC/DC converter according to the first, second, or third aspect wherein the first control circuit has control means that causes the first bridge circuit to carry out a synchronous rectification operation when power is supplied from the second direct current voltage supply to the first direct current voltage supply. Furthermore, a six aspect of the invention is a bidirectional DC/DC converter according to the first, second, and third aspects wherein phase shift control or pulse width modulation (PWM) control is used as the fixed frequency control.

According to embodiments of the invention, by frequency modulation control at a frequency equal to or lower than the resonance frequency of the series resonance circuit being adopted as the control method when power is supplied from the first direct current voltage supply to the second direct current voltage supply, and fixed frequency control being adopted as the control method when power is supplied from the second direct current voltage supply to the first direct current voltage supply, a circuit that regulates the constants of the series resonant circuit becomes unnecessary, and a small-sized bidirectional DC/DC converter with a wide input/output voltage range can be realized. Also, by switching frequency modulation control in the vicinity of the resonance frequency of the series resonant circuit to fixed frequency control when power is supplied from the first direct current voltage supply to the second direct current voltage supply, the minimum operating frequency of the bridge circuit can be set high, and the bidirectional DC/DC converter can be further reduced in size owing to a reduction in size of the isolating transformer.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Figure 1:
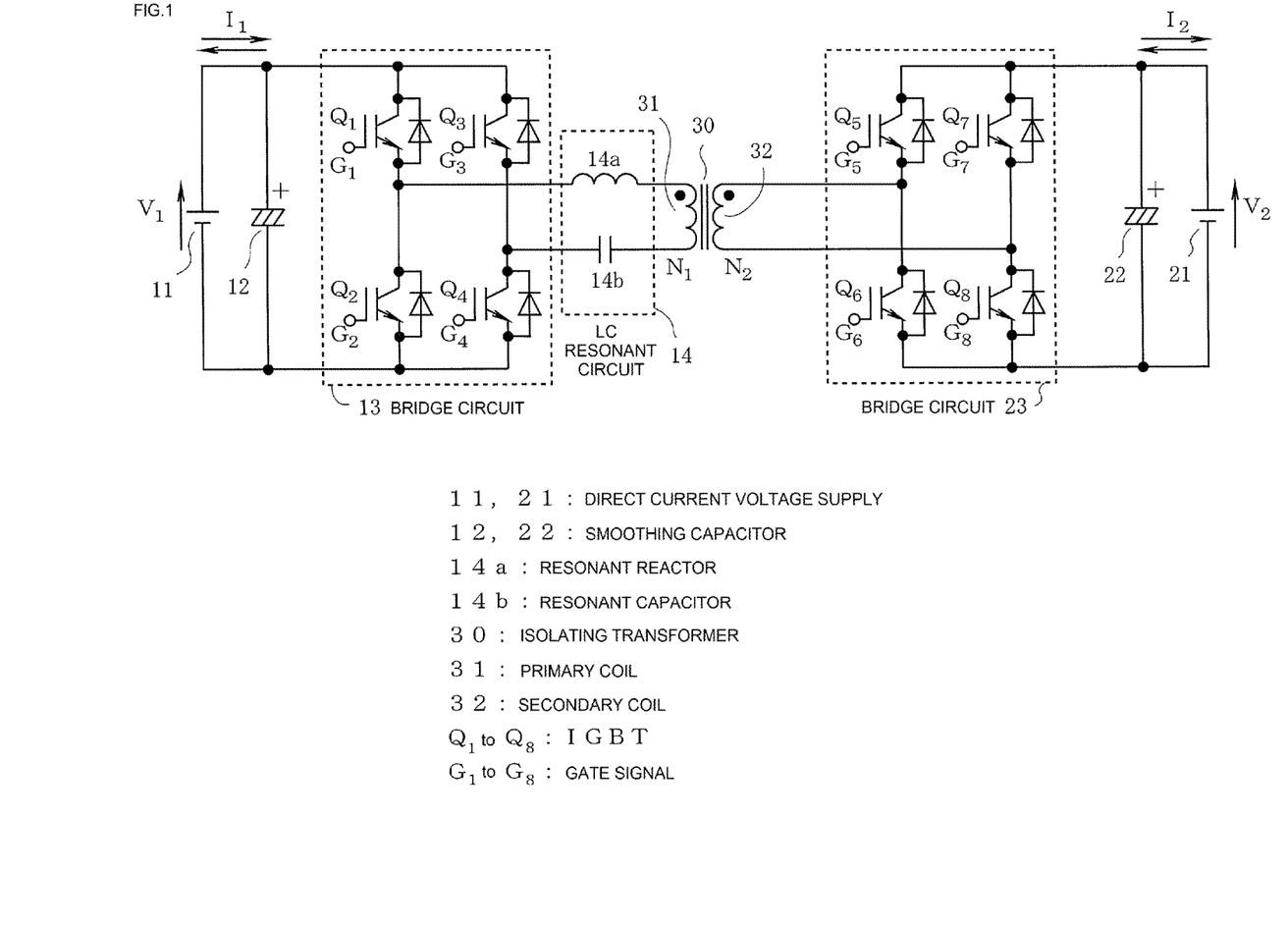
FIG. 1 is a circuit diagram showing a first embodiment of the invention.

Hereafter, based on the drawings, a description will be given of embodiments of the invention. FIG. 1 is a circuit diagram of a resonant bidirectional DC/DC converter according to a first embodiment, wherein the same reference signs are given to components having the same functions as in FIG. 5. That is, as shown in FIG. 1, the first embodiment includes direct current voltage supplies 11 and 21 (the voltages thereof are taken to be $V_1$ and $V_2$ respectively) and smoothing capacitors 12 and 22. Also included are bridge circuits 13 and 23 formed of semiconductor switch elements $Q_1$ through $Q_4$ and $Q_5$ through $Q_8$, such as IGBTs, to which free wheeling diodes are connected in anti-parallel and which operate as a switching circuit or rectifier circuit depending on the direction of power flow. A resonant reactor 14a, a primary coil 31 of an isolating transformer 30, and a resonant capacitor 14b are connected in series between a connection point of the semiconductor switch elements $Q_1$ and $Q_2$ and a connection point of the semiconductor switch elements $Q_3$ and $Q_4$ configuring the bridge circuit 13. An LC resonant circuit 14 acts as a series resonant circuit formed of the resonant reactor 14a and resonant capacitor 14b. The two ends of a secondary coil 32 of the isolating transformer 30 are connected one each to a connection point of the semiconductor switch elements $Q_5$ and $Q_6$ and a connection point of the semiconductor switch elements $Q_7$ and $Q_8$ configuring the bridge circuit 23.

When using this bidirectional converter as, for example, a battery charger, one of the direct current voltage supplies 11 and 21 forms the battery, while the other functions as a direct current power supply, in the same way as in FIG. 5. $G_1$ through $G_8$ are gate signals (gate electrodes) of the semiconductor switch elements $Q_1$ through $Q_8$, and $N_1$ and $N_2$ are the numbers of turns of the coils 31 and 32. As is clear from FIG. 1, the LC resonant circuit 24 in FIG. 5 is omitted in this embodiment.

Figure 2A:
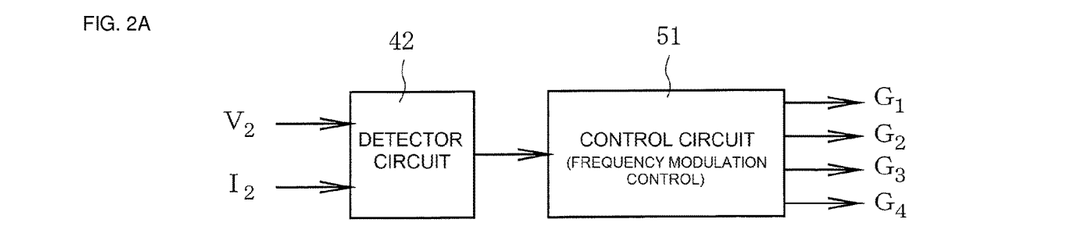
FIGS. 2A and 2B are configuration diagrams showing a first example of control means in the first embodiment.
Figure 2B:
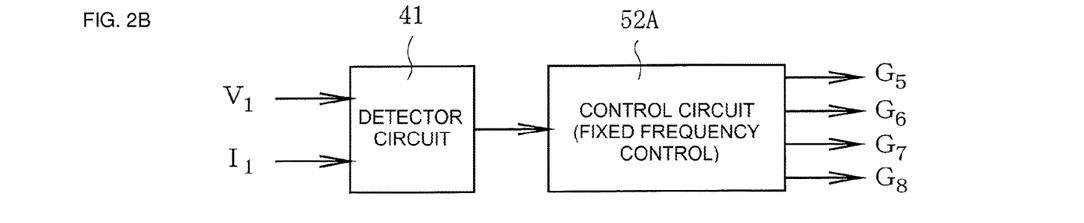

FIGS. 2A and 2B are configuration diagrams showing a first example of control means for controlling the semiconductor switch elements $Q_1$ through $Q_8$ in FIG. 1. FIG. 2A is a control means of the semiconductor switch elements $Q_1$ through $Q_4$ of the bridge circuit 13, and is configured of a detector circuit 42, which detects the voltage $V_2$ and a current $I_2$ of the direct current voltage supply 21, and a control circuit 51 for carrying out PFM control of the semiconductor switch elements $Q_1$ through $Q_4$ based on values detected by the detector circuit 42. Meanwhile, FIG. 2B is a control means of the semiconductor switch elements $Q_5$ through $Q_8$ of the bridge circuit 23, and is configured of a detector circuit 41, which detects the voltage $V_1$ and a current $I_1$ of the direct current voltage supply 11, and a control circuit 52A for carrying out fixed frequency control of the semiconductor switch elements $Q_5$ through $Q_8$ based on values detected by the detector circuit 41. Herein, an input signal of the detector circuit 41 may be either one of the voltage $V_1$ or current $I_1$, and an input signal of the detector circuit 42 may be either one of the voltage $V_2$ or current $I_2$.

The semiconductor switch elements $Q_1$ through $Q_4$ are driven via a gate drive circuit (not shown) by the gate signals $G_1$ through $G_4$ output from the control circuit 51 when power flows from the direct current voltage supply 11 to the direct current voltage supply 21. Therefore, control whereby the voltage (output voltage) $V_2$ of the direct current voltage supply 21 coincides with a command value is carried out. Also, the semiconductor switch elements $Q_5$ through $Q_8$ are driven via a gate drive circuit by the gate signals $G_5$ through $G_8$ output from the control circuit 52A when power flows from the direct current voltage supply 21 to the direct current voltage supply 11. Therefore, control whereby the voltage (output voltage) $V_1$ of the direct current voltage supply 11 coincides with a command value is carried out.

In FIG. 1, the device specifications are such that the voltage $V_1$ of the direct current voltage supply 11 is constant, and the voltage $V_2$ of the direct current voltage supply 21 is controlled in a range from a minimum value $V_{2min}$ to a maximum value $V_{2max}$, in the same way as previously described. In a configuration operated with power flowing from the direct current voltage supply 11 to the direct current voltage supply 21 as a reference, PFM control of the bridge circuit 13 is carried out, the switching frequency of the semiconductor switch elements $Q_1$ through $Q_4$ when the output voltage is the minimum value $V_{2min}$ is set to a resonance frequency $f_r$ of the LC resonant circuit 14, and a turn ratio a of the isolating transformer 30 is set to $N_1/N_2=V_1/V_{2min}$. As a result of this, the switching frequency is controlled to or below the resonance frequency $f_r$, and the output voltage $V_2$ can be controlled within a range wherein the minimum value is $V_{2min}=(1/a)\times V_1$ (the switching frequency=the resonance frequency $f_r$ of the LC resonant circuit) and the maximum value is $V_{2max}=(1/a)\times V_1\times\alpha$ ($\alpha$ is the voltage conversion gain when the switching frequency is $f_r$ or less).

When power flows from the direct current voltage supply 21 to the direct current voltage supply 11, the bridge circuit 23 is caused to operate by fixed frequency control (for example, phase shift control or PWM control). In this case, when the input voltage $V_2$ is the minimum value $V_{2min}$, $a\times V_{2min}\times duty_1=V_1$ when taking the duty ratio to be $duty_1=1$, and when the input voltage $V_2$ is the maximum value $V_{2max}$, $a\times V_{2max}\times duty_2=V_1$ when taking the duty ratio to be $duty_2=V_1/(a\times V_{2max})$. Using the heretofore described kind of operation, the predetermined voltage $V_1$ can be output even when the input voltage changes within the range of $V_{2min}$ to $V_{2max}$. As the bridge circuit 13 operates as a rectifier circuit when power flows from the direct current voltage supply 21 to the direct current voltage supply 11, the switching frequency of the semiconductor switch elements $Q_5$ through $Q_8$ of the bridge circuit 23 operating as a switching circuit can be arbitrarily set without utilizing resonance phenomenon of the LC resonance circuit 14. Therefore, a circuit that regulates the constants of the LC resonant circuit 14 is unnecessary.

As heretofore described, according to the first example shown in FIGS. 2A and 2B, the voltage of the direct current voltage supply 11 can be $V_1$, and the voltage of the direct current voltage supply 21 can be controlled within the range of $V_{2min}$ to $V_{2max}$, whether power flows from the direct current voltage supply 11 to the direct current voltage supply 21 or from the direct current voltage supply 21 to the direct current voltage supply 11.

Figure 3A:
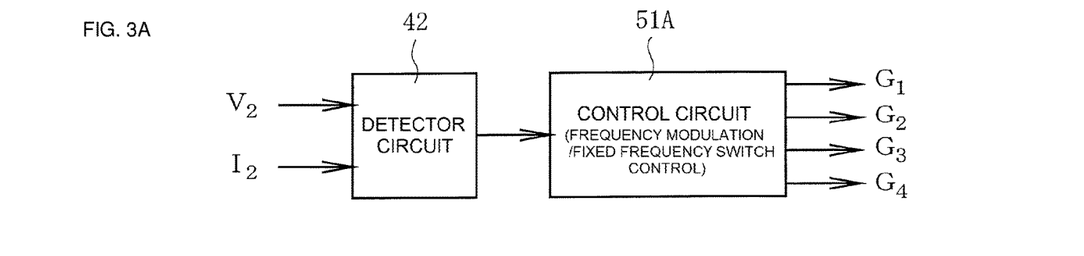
FIGS. 3A and 3B are configuration diagrams showing a second example of control means in the first embodiment.
Figure 3B:
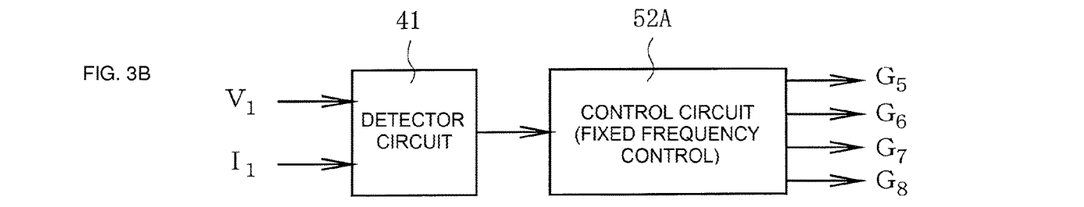

Next, FIGS. 3A and 3B are configuration diagrams showing a second example of control means for controlling the semiconductor switch elements $Q_1$ through $Q_8$ in FIG. 1. FIG. 3A is a control means of the semiconductor switch elements $Q_1$ through $Q_4$ of the bridge circuit 13 and is configured of the detector circuit 42, which detects the voltage $V_2$ and current $I_2$ of the direct current voltage supply 21, and a control circuit 51A for controlling the semiconductor switch elements $Q_1$ through $Q_4$ by switching between PFM control and fixed frequency control (for example, phase shift control or PWM control) based on values detected by the detector circuit 42. Herein, the control circuit 51A is configured to carry out PFM control at a frequency lower than the resonance frequency $f_r$ and carry out fixed frequency control in the vicinity of the resonance frequency $f_r$, and the two controls are switched in accordance with a control amount determined from values detected by the detector circuit 42. Also, FIG. 3B is a control means of the semiconductor switch elements $Q_5$ through $Q_8$ of the bridge circuit 23, and is configured, in the same way as in FIGS. 2A and 2B, of the detector circuit 41 and the control circuit 52A that carries out fixed frequency control of the semiconductor switch elements $Q_5$ through $Q_8$ based on values detected by the detector circuit 41.

The semiconductor switch elements $Q_1$ through $Q_4$ are driven by the gate signals $G_1$ through $G_4$ output from the control circuit 51A when power flows from the direct current voltage supply 11 to the direct current voltage supply 21, and the semiconductor switch elements $Q_5$ through $Q_8$ are driven by the gate signals $G_5$ through $G_8$ output from the control circuit 52A when power flows from the direct current voltage supply 21 to the direct current voltage supply 11.

A detailed description will be given of operations of the second example. In FIG. 1, the device specifications are such that the voltage $V_1$ of the direct current voltage supply 11 is constant, and the voltage (output voltage) $V_2$ of the direct current voltage supply 21 is controlled in a range from the minimum value $V_{2min}$ to the maximum value $V_{2max}$, in the same way as previously described. When designing with operations when power flows from the direct current voltage supply 11 to the direct current voltage supply 21 as a reference, the output voltage $V_2$, when switching between fixed frequency control and PFM control in the control circuit 51A, is set to an intermediate value $V_{2mid}$ of the range $V_{2min}$ to $V_{2max}$ (that is, the output voltage minimum value under PFM control is set to $V_{2mid}$), and the turn ratio of the isolating transformer 30 is taken to be $a=N_1/N_2=V_1/V_{2mid}$. Therefore, the output voltage $V_{2mid}$ and operating frequency (resonance frequency $f_r$) are fixed when switching between fixed frequency control and PFM control, regardless of the size of the load. Consequently, the switching frequency is always the same frequency (the resonance frequency $f_r$) when carrying out fixed frequency control, and the switching frequency is controlled to or below the resonance frequency $f_r$ when carrying out PFM control.

Furthermore, when power flows from the direct current voltage supply 11 to the direct current voltage supply 21, the control circuit 51A switches to fixed frequency control (switching frequency: $f_r$), whereby the output voltage $V_2$ can be controlled to a value equal to or lower than $V_{2mid}$ when the control amount determined from values detected by the detector circuit 42 is a control amount corresponding to a voltage that can be output by a fixed frequency control operation. Also, when the control amount determined from values detected by the detector circuit 42 is a control amount that exceeds the maximum value of a voltage that can be output by a fixed frequency control operation, the control circuit 51A switches to PFM control (switching frequency: $<f_r$), whereby the output voltage $V_2$ can be controlled to a voltage equal to or greater than $V_{2mid}$.

Therefore, the output voltage $V_2$ can be controlled within the range of $V_{2min}$ to $V_{2max}$ when the input voltage is $V_1$. In particular, according to the control method whereby switching between fixed frequency control and PFM control is carried out by the control circuit 51A, the range over which voltage can changed by PFM control is reduced, because of which the minimum operating frequency can be set higher than in the first example of FIGS. 2A and 2B. As a result of this, a reduction in size of the isolating transformer 30, and therefore a reduction in size of the whole device, can be achieved.

Because operations when power flows from the direct current voltage supply 21 to the direct current voltage supply 11 are the same as in the first example, a description will be omitted. As heretofore described, according to the second example, the voltage of the direct current voltage supply 11 can be $V_1$, and the voltage of the direct current voltage supply 21 can be controlled within the range of $V_{2min}$ to $V_{2max}$, whether power flows from the direct current voltage supply 11 to the direct current voltage supply 21 or from the direct current voltage supply 21 to the direct current voltage supply 11, and the size can be reduced further than in the first example. In the first embodiment, the LC resonant circuit 14 acting as a series resonant circuit is configured by the resonant reactor 14a and resonant capacitor 14b being connected in series, but the LC resonant circuit may be configured utilizing the leakage inductance of the isolating transformer 30 instead of the resonant reactor 14a.

Figure 4:
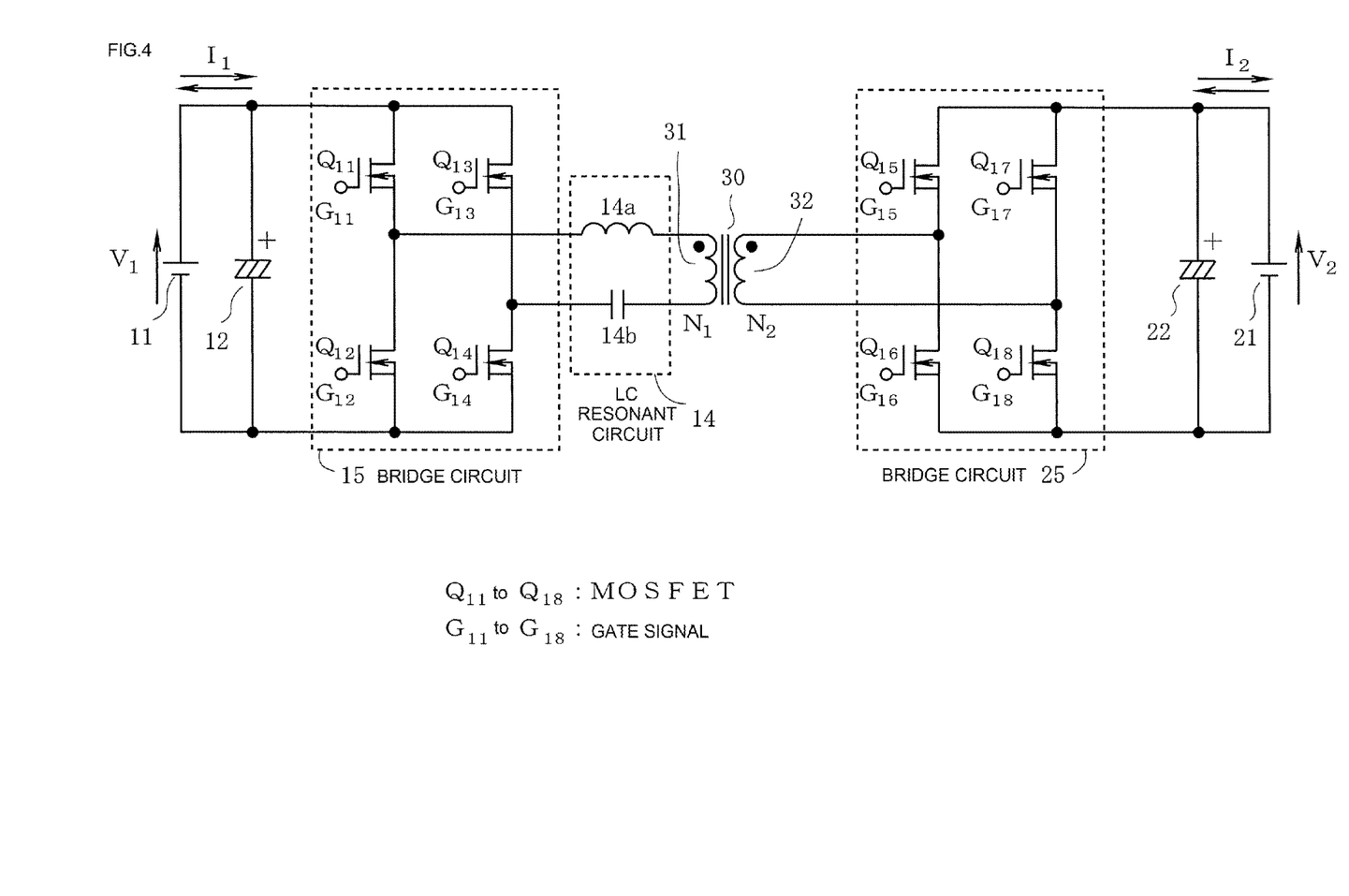
FIG. 4 is a circuit diagram showing a second embodiment of the invention.

Also, in the embodiment of FIG. 1, a description has been given of a case wherein IGBTs are used as the semiconductor switch elements $Q_5$ through $Q_8$ configuring the bridge circuits 13 and 23, but the same advantages can also be obtained when using MOSFETs as semiconductor switch elements $Q_{11}$ through $Q_{18}$ (gate signals are shown as $G_{11}$ through $G_{18}$), as shown in a second embodiment of FIG. 4. In this case, a bridge circuit acting as a rectifier circuit (a bridge circuit 25 when power flows from the direct current voltage supply 11 to the direct current voltage supply 21, a bridge circuit 15 when power flows from the direct current voltage supply 21 to the direct current voltage supply 11), may be caused to carry out a synchronous rectification operation.

Reference signs and numerals are as follows:
11, 21: Direct current voltage supply
12, 22: Smoothing capacitor
13, 23: Bridge circuit
14: LC resonant circuit
14a: Resonant reactor
14b: Resonant capacitor
30: Isolating transformer
31: Primary coil
32: Secondary coil
41, 42: Detector circuit
51, 51A, 52A: Control circuit
$Q_1$ through $Q_8$, $Q_{11}$ through $Q_{18}$: Semiconductor switch element
$G_1$ through $G_8$, $G_{11}$ through $G_{18}$: Gate signal Although a few embodiments have been shown and described, it would be appreciated by those skilled in the art that changes may be made in these embodiments without departing from the principles and spirit of the invention, the scope of which is defined in the claims and their equivalents.

What is claimed is:

1. A bidirectional DC/DC converter, comprising:
    a first bridge circuit connected to a first direct current voltage supply and formed of a plurality of semiconductor switch elements;
    a second bridge circuit connected to a second direct current voltage supply and formed of a plurality of semiconductor switch elements;
    an isolating transformer that isolates the first bridge circuit from the second bridge circuit; and
    a series resonant circuit connected between an alternating current side of the first bridge circuit and the isolating transformer, wherein the bidirectional DC/DC converter is configured to supply power bidirectionally between the first direct current voltage supply and the second direct current voltage supply by having the first bridge circuit or the second bridge circuit carry out a switching operation,
    a first detector circuit configured to detect at least one of a voltage or a current of the first direct current voltage supply;
    a second detector circuit configured to detect at least one of a voltage or a current of the second direct current voltage supply;
    a first control circuit configured to control the first bridge circuit based on a value detected by the second detector circuit, the first control circuit configured to
        carry out a fixed frequency control in the vicinity of a resonance frequency of the series resonant circuit,
        carry out a pulse frequency modulation control at a frequency equal to or lower than the resonance frequency, and
        switch between the fixed frequency control and the pulse frequency modulation control based on a control amount determined in accordance with a value of the at least one of the voltage or the current of the second direct current voltage supply detected by the second detector circuit when power is supplied from the first direct current voltage supply to the second direct current voltage supply; and
    a second control circuit configured to control the second bridge circuit based on a value of the at least one of the voltage or the current of the first direct current voltage supply detected by the first detector circuit, the second control circuit configured to carry out a fixed frequency control of the second bridge circuit based on a control amount determined in accordance with a value of the at least one of the voltage or the current of the first direct current voltage supply detected by the first detector circuit when power is supplied from the second direct current voltage supply to the first direct current voltage supply,
    wherein the first control circuit is configured to switch from the fixed frequency control to the pulse frequency modulation control when the control amount determined in accordance with a value of the at least one of the voltage or the current of the second direct current voltage supply detected by the second detector circuit is a control amount that exceeds a maximum value that can be output by a fixed frequency control operation of the converter.

2. The bidirectional DC/DC converter according to claim 1, wherein the second control circuit is configured to cause the second bridge circuit to carry out a synchronous rectification operation when power is supplied from the first direct current voltage supply to the second direct current voltage supply.

3. The bidirectional DC/DC converter according to claim 1, wherein the first control circuit is configured to cause the first bridge circuit to carry out a synchronous rectification operation when power is supplied from the second direct current voltage supply to the first direct current voltage supply.

4. The bidirectional DC/DC converter according to claim 1, wherein a phase shift control is the fixed frequency control of the semiconductor switch elements.

5. The bidirectional DC/DC converter according to claim 1, wherein a pulse width modulation control is the fixed frequency control of the semiconductor switch elements.

\* \* \* \* \*